(12) United States Patent
Griess et al.

(10) Patent No.: US 9,440,422 B2
(45) Date of Patent: Sep. 13, 2016

(54) PEEL-RESISTANT MECHANISM FOR USE IN BONDING COMPONENTS

(71) Applicant: The Boeing Company, Huntington Beach, CA (US)

(72) Inventors: Kenneth Harlan Griess, Kent, WA (US); Gary E. Georgeson, Tacoma, WA (US); Russell Lee Keller, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 14/522,102

(22) Filed: Oct. 23, 2014

(65) Prior Publication Data

US 2015/0041044 A1    Feb. 12, 2015

Related U.S. Application Data

(62) Division of application No. 13/269,062, filed on Oct. 7, 2011, now Pat. No. 8,895,130.

(51) Int. Cl.
| | |
|---|---|
| *B32B 37/12* | (2006.01) |
| *B29C 73/10* | (2006.01) |
| *B32B 37/18* | (2006.01) |

(52) U.S. Cl.
CPC .......... *B32B 37/1284* (2013.01); *B29C 73/10* (2013.01); *B32B 37/18* (2013.01); *B32B 2307/50* (2013.01); *B32B 2405/00* (2013.01); *Y10T 156/10* (2015.01); *Y10T 428/168* (2015.01); *Y10T 428/21* (2015.01); *Y10T 428/24777* (2015.01)

(58) Field of Classification Search
CPC .... B29C 73/10; Y10T 428/21; Y10T 156/10
USPC .......................................................... 156/60
See application file for complete search history.

(56) References Cited

U.S. PATENT DOCUMENTS

| | | |
|---|---|---|
| 2,855,014 A | 10/1958 | Gruber |
| 8,524,356 B1 | 9/2013 | Dan-Jumbo et al. |
| 2006/0127647 A1 | 6/2006 | Thrush |
| 2007/0264458 A1 | 11/2007 | Luna et al. |
| 2010/0227105 A1 | 9/2010 | Dan-Jumbo et al. |
| 2010/0227106 A1 | 9/2010 | Dan-Jumbo et al. |
| 2010/0227117 A1 | 9/2010 | Dan-Jumbo et al. |
| 2011/0177309 A1 | 7/2011 | Dan-Jumbo et al. |

FOREIGN PATENT DOCUMENTS

EP        0258596 A3    8/1989

OTHER PUBLICATIONS

Soutis, C. et al., Design and Performance of Bonded Patch Repairs of Composite Structures, Proc Instn Mech Engrs, vol. 211 Part G, IMechE 1997, pp. 263-271.

(Continued)

*Primary Examiner* — Xiao Zhao
(74) *Attorney, Agent, or Firm* — Armstrong Teasdale LLP

(57) ABSTRACT

A peel-resistant mechanism includes a body and a plurality of arms extending from the body such that a recess is defined between each pair of adjacent arms. At least one of the arms is positionable to facilitate restricting an edge disbond from spreading across the body of the patch.

12 Claims, 8 Drawing Sheets

(56) References Cited

OTHER PUBLICATIONS

Zimmerman, K. et al., Geometrical Parameters in Composite Repair; Journal of Composite Materials, 1995, vol. 29, No. 11, Technomic Publishing Co., pp. 1473-1487.

Wang, C. et al., Optimum Shapes for Minimising Bond Stress in Scarf Repairs; 5th Australasian Congress on Applied Mechanics, Dec. 10-12, 2007, Brisbane, Australia, pp. 1-6.

US Dept. of Transportation and Federal Aviation Administration Memorandum entitled: Bonded Joints and StructuresTechnical Issues and Certification Considerations, Sep. 2, 2005, pp. 1-26.

International Search Report and Written Opinion of PCT Application No. PCT/US2012/046781 dated Nov. 29, 2012, 11 pp.

Japanese Office Action dated Feb. 23, 2016 for related application 2014-543561; 7 pp.

Canada Office Action dated Apr. 10, 2015 for related application No. 2,848,081; 7 pp.

PEEL-RESISTANT MECHANISM FOR USE IN BONDING COMPONENTS

CROSS REFERENCE TO RELATED APPLICATIONS

This application is a divisional and claims priority to U.S. patent application Ser. No. 13/269,062 filed Oct. 7, 2011 for "PEEL-RESISTANT MECHANISM FOR USE IN BONDING COMPONENTS", which is hereby incorporated by reference in its entirety.

BACKGROUND

The present disclosure relates generally to coupling mechanisms and, more particularly, to a peel-resistant edge that may be used to bond a plurality of components together and/or repair a structure.

Known aircraft systems include a plurality of components that are coupled and/or bonded together. Over time, at least some of the components may become uncoupled and/or disbonded from each other and/or from the system. Moreover, at least some known aircraft systems require routine maintenance including repair of structural inconsistencies. At least some known structural inconsistencies are repaired using a bonded patch to reduce or eliminate the effects of the structural inconsistencies. Over time, at least some known patches may disbond due to inadequate adhesive properties, surface preparation, and/or a premature failure due to out-of-plane conditions created along the outer edges of the patch.

BRIEF DESCRIPTION

In one aspect, a method is provided for use in providing a peel-resistant mechanism. The method includes positioning a body, and forming a plurality of arms on the body. Each of the arms includes a first section coupled to the body and a second section extending from the body such that a recess is defined between each pair of adjacent arms. The first section has a smaller width than the second section, and the second section is wider than a greatest width of the recess. At least one of the plurality of arms is positionable to facilitate restricting an edge disbond from spreading across the body of the patch.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The subject matter described herein relates generally to coupling mechanisms and, more particularly, to a peel-resistant edge that may be used to bond a plurality of components together and/or repair a structure. In one embodiment, a peel-resistant mechanism is provided that includes a body and a plurality of arms that extend from the body such that a recess is defined between adjacent arms. At least one of the arms is positionable to facilitate restricting an edge disbond from spreading across the body. The peel-resistant mechanism is applicable wherever there is a desire to securely bond two structural components and/or elements together. For example, the peel-resistant mechanism is applicable in production and/or repair. The unique edge trim on bonded components can create a failsafe-type behavior for bonded joints.

As used herein, an element or step recited in the singular and proceeded with the word "a" or "an" should be understood as not excluding plural elements or steps unless such exclusion is explicitly recited. Moreover, references to "one embodiment" of the present invention and/or the "exemplary embodiment" are not intended to be interpreted as excluding the existence of additional embodiments that also incorporate the recited features.

Figure 1:
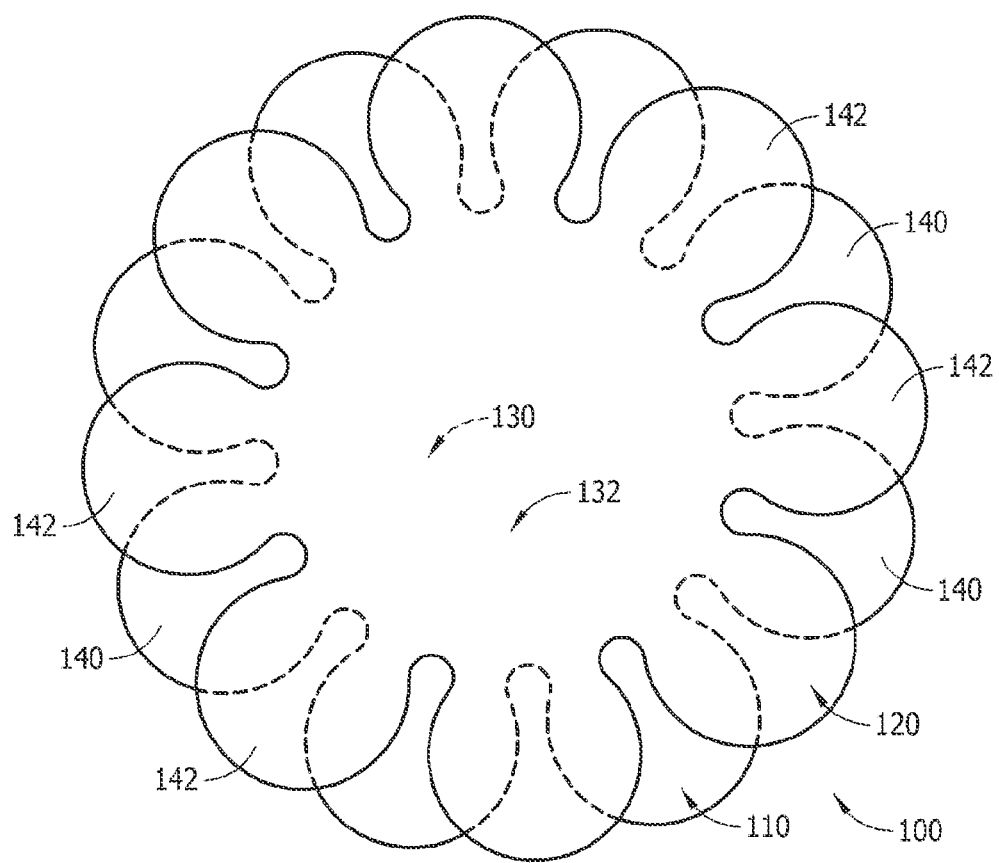
FIG. 1 is a schematic illustration of a peel-resistant assembly.

FIG. 1 is a schematic illustration of an exemplary two-ply, peel-resistant assembly 100 for use in coupling a plurality of components (not shown) together and/or repairing a structure (not shown). In the exemplary embodiment, assembly 100 includes at least a first adherent or patch 110 and a second adherent or patch 120. Assembly 100 may be fabricated with any number of plies that enables assembly 100 to function as described herein. Moreover, each ply may include any fiber orientation and/or may be fabricated from any material that enables assembly 100 to function as described herein.

In the exemplary embodiment, first patch 110 includes a first body 130 and a plurality of arms 140 that extend from body 130, and second patch 120 includes a second body 132 and a second plurality of arms 142 that extend from body 132. As described in more detail below, each arm 140 and 142 is positionable to facilitate restricting an edge disbond from traversing or spreading across body 130 and 132, respectively.

Moreover, in the exemplary embodiment, first patch 110 and second patch 120 are oriented in a staggered arrangement that facilitates increasing a damage-isolation capability of assembly 100. More specifically, in the exemplary embodiment, each arm 140 extending from first patch 110 is positioned between adjacent arms 142 extending from second patch 120, and/or each arm 142 extending from second patch 120 is positioned between adjacent arms 140 extending from first patch 110. Alternatively, patches 110 and 120 may be oriented and/or positioned in any arrangement that enables assembly 100 to function as described herein. For example, patches 110 and 120 may be substantially aligned such that patch 120 is on substantially covers patch 110.

Figure 2:
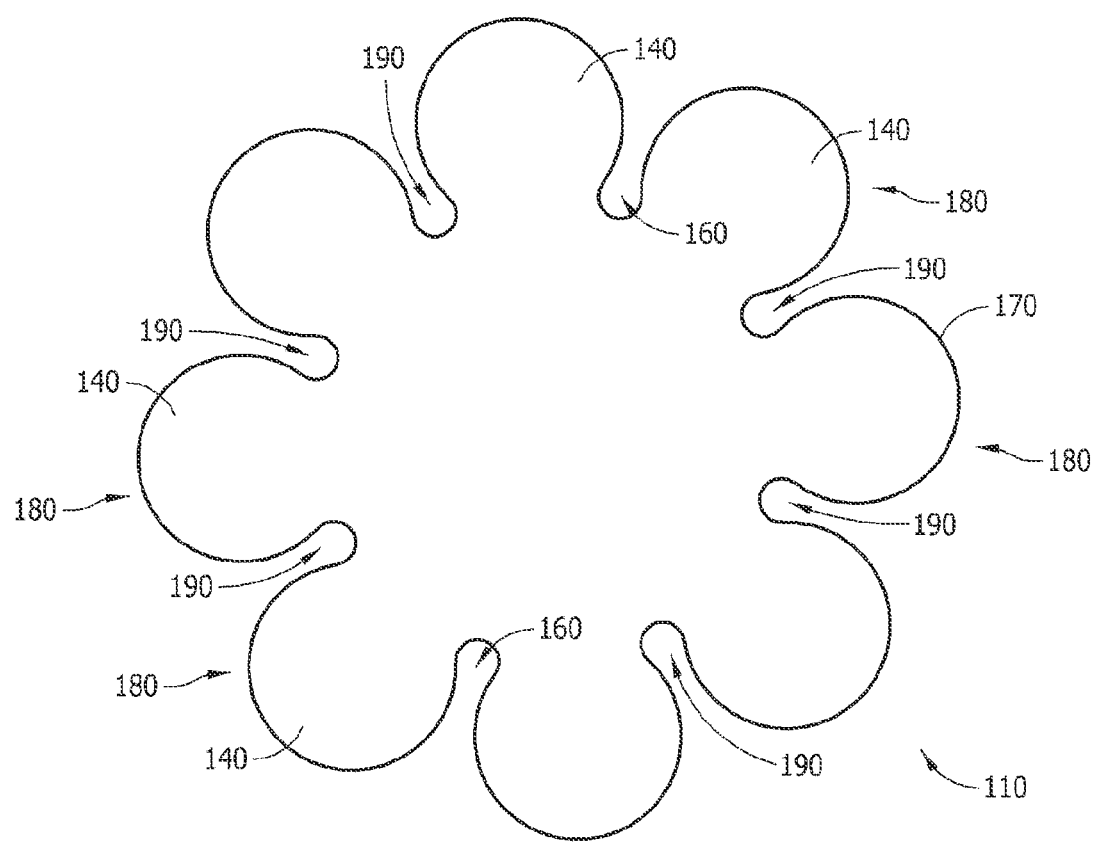
FIG. 2 is a perspective view of an exemplary peel-resistant mechanism that may be used with the peel-resistant assembly shown in FIG. 1.

FIG. 2 is a perspective view of first patch 110. In the exemplary embodiment, first patch 110 is substantially identical to second patch 120. More specifically, in the exemplary embodiment, patches 110 and 120 are substantially similar in shape and/or size. As such, first patch 110 and second patch 120 are described generally herein as patch 110. Alternatively, first patch 110 and second patch 120 may have any shape and/or size, including different shapes and/or sizes, that enables assembly 100 to function as described herein. Moreover, first patch 110 and second patch 120 may include any fiber orientation and/or may be fabricated from any material that enables assembly 100 to function as described herein.

In the exemplary embodiment, patch 110 has a peel-resistant mechanism or an outer edge 170 that is formed with a plurality of peaks 180 and a plurality of valleys 190 arranged in a scalloped pattern that defines arms 140 and/or recesses 160, respectively. More specifically, in the exemplary embodiment, edge 170 facilitates increasing an outer perimeter and circumference of patch 110 while decreasing stress gradients within patch 110. In the exemplary embodiment, each arm 140 floats such that a substantially consistent bondline may be provided along edge 170. For example, arms 140 and 142 enable edge 170 to substantially follow a contour of the component and/or the structure such that the bondline remains substantially consistent along edge 170. As such, disbond initiation and/or growth of patch 110 is limited by edge 170. In the exemplary embodiment, patch 110 has a thickness that is less than approximately 0.250 inches (in.). More particularly, in the exemplary embodiment, the thickness is less than approximately 0.125 in. Even more particularly, in the exemplary embodiment, the thickness is approximately 0.060 in. for at least a portion of patch 110 and tapers towards outer edge 170. Alternatively, patch 110 may have any thickness that enables assembly 100 to function as described herein.

Moreover, in the exemplary embodiment, arms 140 extend generally radially from a center 150 of body 130. Each recess 160 is defined between adjacent arms 140. In the exemplary embodiment, the scalloped design of edge 170 is substantially constant about body 130 such that arms 140 are substantially identical in shape and/or size, and patch 110 is substantially symmetrical. Alternatively, arms 140 may each have any shape and/or size that enables patch 110 to function as described herein.

In the exemplary embodiment, patch 110 is fabricated from a pliable and/or workable material that enables providing a substantially consistent bondline along edge 170. For example, in the exemplary embodiment, patch 110 may be fabricated from, without limitation, graphite, glass, fabric, tape, aluminum, and/or any other fiber, resin, metallic and/or composite materials that enable patch 110 to function as described herein.

Figure 3:
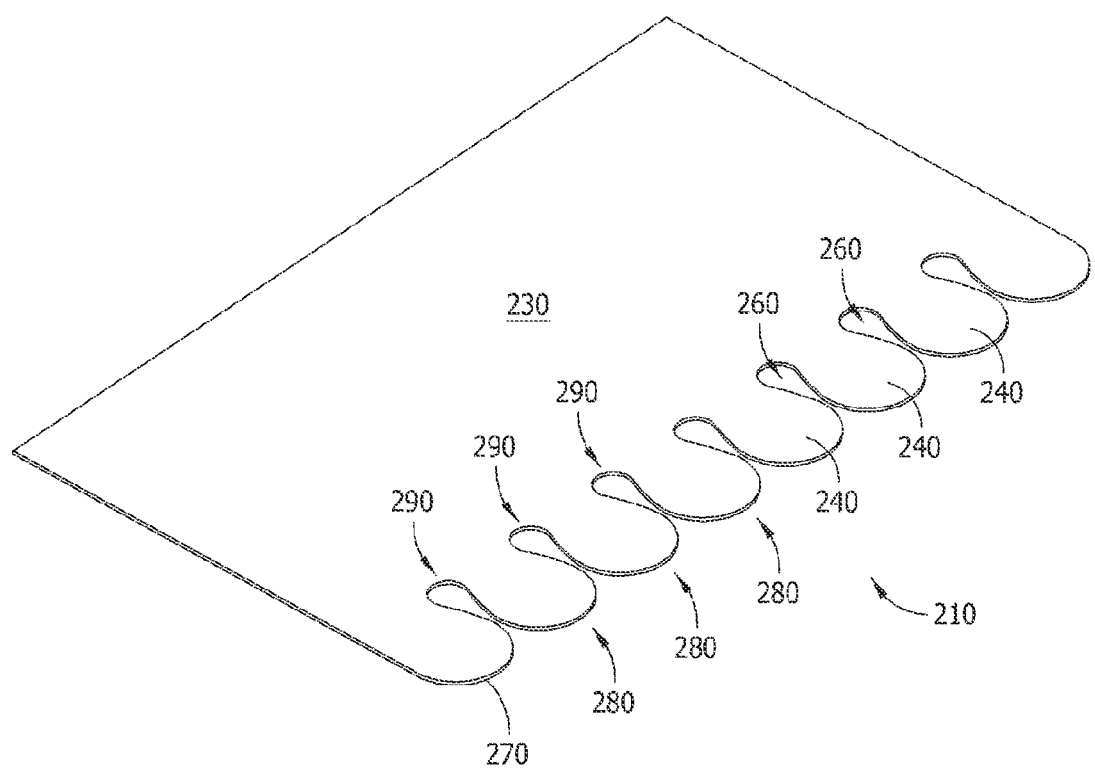
FIGS. 3-6 is a perspective view of alternative peel-resistant mechanisms.

FIG. 3-6 is a perspective view of alternative peel resistant applied edge details or patches 210, 310, 410, and 510, respectively. As shown in FIG. 3, patch 210 may be used in a production application and includes a body 230 and a plurality of arms 240 that extend from body 230. In the exemplary embodiment, patch 210 has an outer edge 270 that is formed with a plurality of peaks 280 and a plurality of valleys 290 arranged in a scalloped pattern that defines arms 240 and/or recesses 260, respectively. In the exemplary embodiment, body 230 is substantially rectangular in shape, and arms 240 extend generally parallel to each other from body 230. Each recess 260 is defined between adjacent arms 240. In the exemplary embodiment, the scalloped design of edge 270 is substantially constant about body 230 such that arms 240 are substantially identical in shape and/or size. Alternatively, arms 240 may have any shape and/or size that enables patch 210 to function as described herein.

Figure 4:
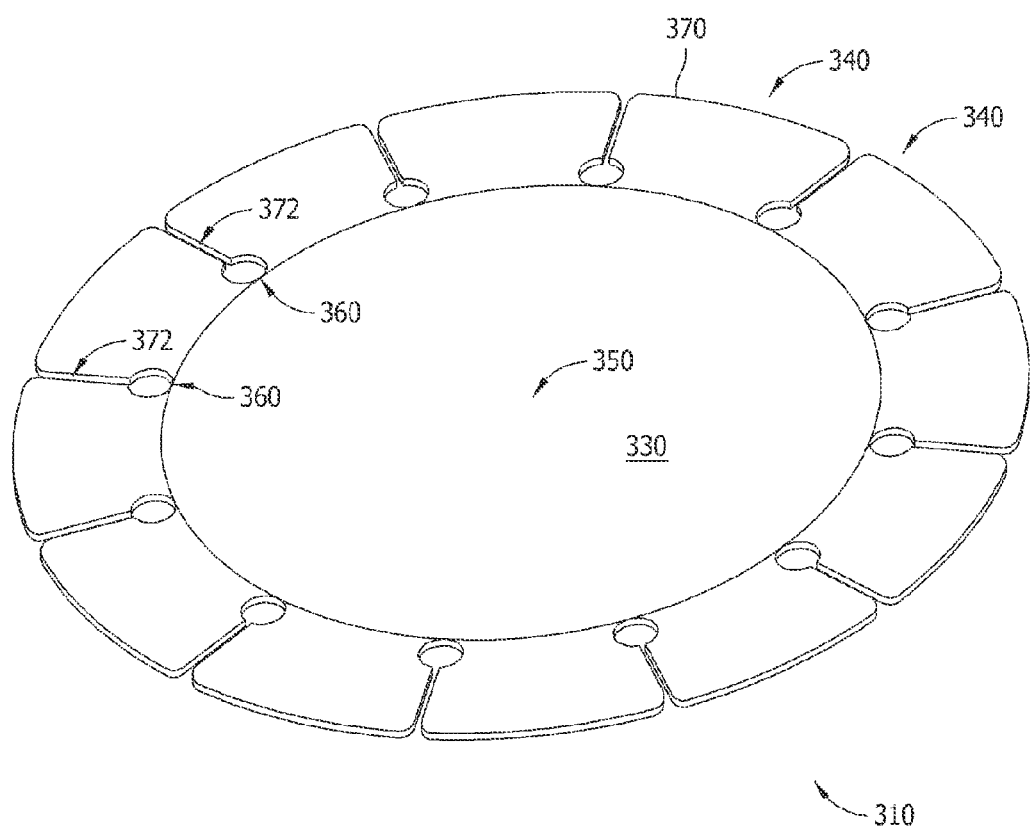

As shown in FIG. 4, patch 310 may be used in a repair application and includes a body 330 and a plurality of arms 340 that extend from body 330. In the exemplary embodiment, arms 340 extend generally radially from a center 350 of body 330. In the exemplary embodiment, patch 310 has an outer edge 370 that is formed such that a slit 372 and a recess or opening 360 is defined between adjacent arms 340. In the exemplary embodiment, slit 372 has a width that is less than approximately 0.15 in. More particularly, in the exemplary embodiment, the width is less than approximately 0.100 in. Even more particularly, in the exemplary embodiment, the width is approximately 0.050 in. Alternatively, slit 372 may have any width that enables patch 310 to function as described herein. Moreover, in the exemplary embodiment, opening 360 has a diameter that is between approximately 0.25 in. and approximately 0.50 in. More particularly, in the exemplary embodiment, the diameter is between approximately 0.30 in. and 0.45 in. Even more particularly, in the exemplary embodiment, the diameter is approximately 0.375 in. Alternatively, opening 360 may have any diameter that enables patch 310 to function as described herein. In the exemplary embodiment, the design of edge 370 is substantially constant about body 330 such that arms 340 are substantially identical in shape and/or size. Alternatively, arms 340 may have any shape and/or size that enables patch 310 to function as described herein.

Figure 5:
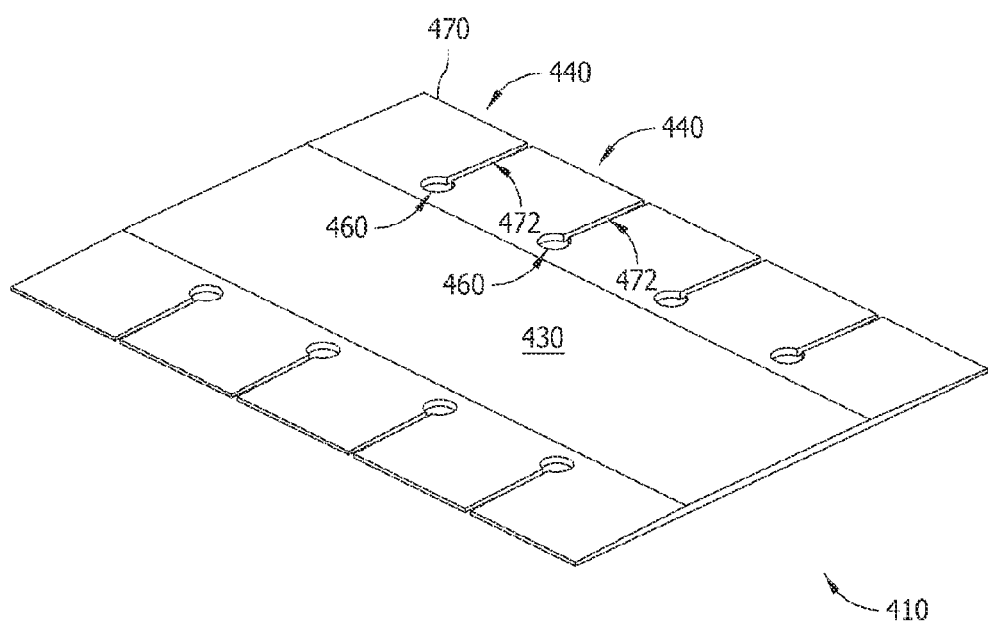

As shown in FIG. 5, patch 410 may be used in a production and/or repair application and includes a body 430 and a plurality of arms 440 that extend from body 430. In the exemplary embodiment, patch 410 has an outer edge 470 that is formed such that a slit 472 and a recess or opening 460 is defined between adjacent arms 440. In the exemplary embodiment, slit 472 has a width that is less than approximately 0.15 in. More particularly, in the exemplary embodiment, the width is less than approximately 0.100 in. Even more particularly, in the exemplary embodiment, the width is approximately 0.050 in. Alternatively, slit 472 may have any width that enables patch 410 to function as described herein. Moreover, in the exemplary embodiment, opening 460 has a diameter that is between approximately 0.25 in. and approximately 0.50 in. More particularly, in the exemplary embodiment, the diameter is between approximately 0.30 in. and 0.45 in. Even more particularly, in the exemplary embodiment, the diameter is approximately 0.375 in. Alternatively, opening 460 may have any diameter that enables patch 410 to function as described herein. In the exemplary embodiment, body 430 is substantially rectangular in shape, and arms 440 extend generally parallel to each other from body 430. In the exemplary embodiment, the design of edge 470 is substantially constant about body 430 such that arms 440 are substantially identical in shape and/or size. Alternatively, arms 440 may have any shape and/or size that enables patch 410 to function as described herein.

Figure 6:
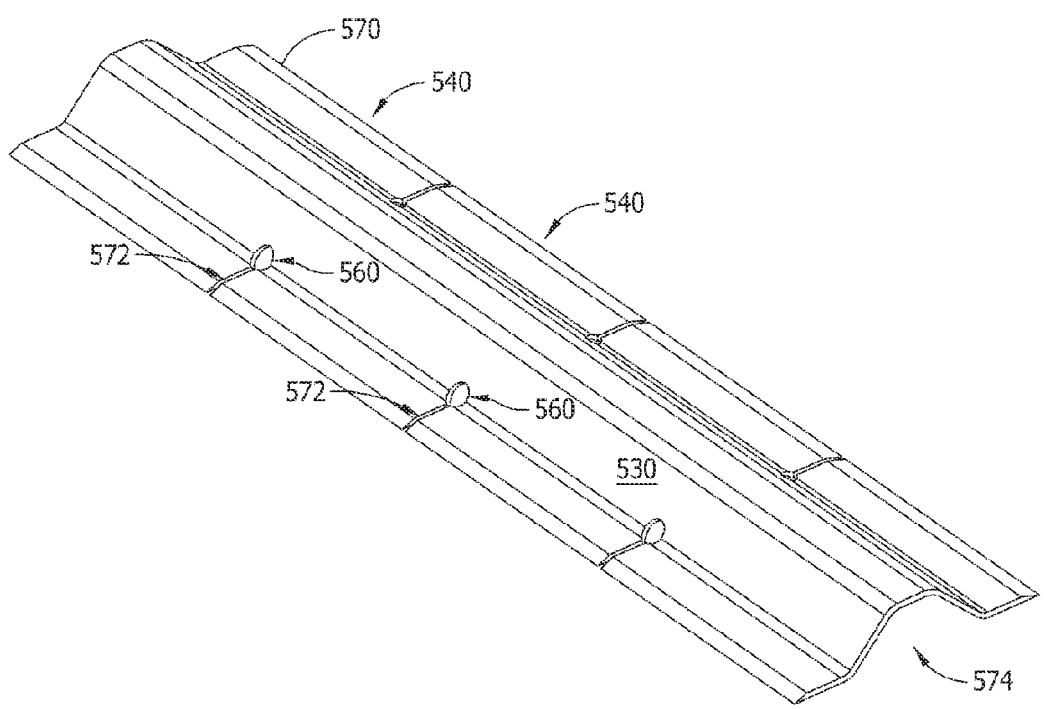

As shown in FIG. 6, patch 510 may be used in a production application of a stringer and includes a body 530 and a plurality of arms 540 that extend from body 530. In the exemplary embodiment, patch 510 has an outer edge 570 that is formed such that a slit 572 and a recess or opening 560 is defined between adjacent arms 540. In the exemplary embodiment, slit 572 has a width that is less than approximately 0.15 in. More particularly, in the exemplary embodiment, the width is less than approximately 0.10 in. Even more particularly, in the exemplary embodiment, the width is approximately 0.050 in. Alternatively, slit 572 may have any width that enables patch 510 to function as described herein. Moreover, in the exemplary embodiment, opening 560 has a diameter that is between approximately 0.25 in. and approximately 0.50 in. More particularly, in the exemplary embodiment, the diameter is between approximately 0.30 in. and 0.45 in. Even more particularly, in the exemplary embodiment, the diameter is approximately 0.375 in. Alternatively, opening 560 may have any diameter that enables patch 510 to function as described herein. In the exemplary embodiment, body 530 is shaped and/or contoured to define a channel 574 that is shaped and/or sized to receive another component, such as a stringer, and arms 540 extend generally parallel to each other from body 530. In the exemplary embodiment, the design of edge 570 is substantially constant about body 530 such that arms 540 are substantially identical in shape and/or size. Alternatively, arms 540 may have any shape and/or size that enables patch 510 to function as described herein.

Figure 7:
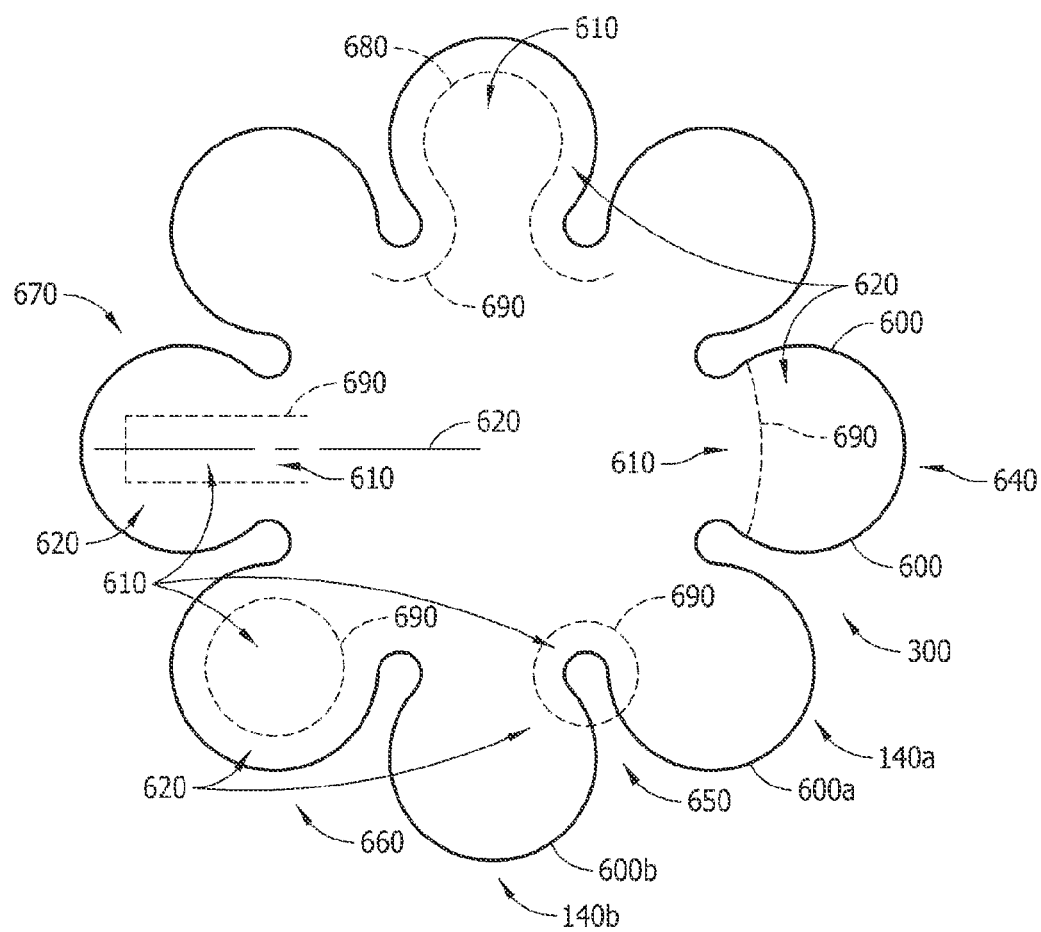
FIG. 7 is a schematic illustration of exemplary adhesive patterns that may be used with the peel-resistant mechanisms shown in FIGS. 2-6.

FIG. 7 is a schematic illustration of exemplary adhesive patterns that may be used with peel-resistant patch 110. In the exemplary embodiment, an adhesive layer 600 extends across an underside of patch 110 to facilitate bonding patch 110 to the structure. More specifically, in the exemplary embodiment, patch 110 may be used for use with pre-cured and/or green (i.e., uncured or wet lay-up) bonded repairs in a flush (e.g., scarfed/stepped) and/or overlay arrangement. Moreover, patch 110 may be used as a doubler (overlay) patch over a cracked metal structure or as a preventative measure over a metal structure that has a potential for cracking.

In the exemplary embodiment, adhesive layer 600 includes a first portion 610 including a first adhesive (not shown) that has a first adhesive property, and a second portion 620 that has a second adhesive (not shown) that has a second adhesive property that is different than the first adhesive property. The different adhesives facilitate creating and/or increasing a disbond-resistant barrier of patch 110. For example, in the exemplary embodiment, the first adhesive provides a relatively strong, stiff bondline, while the second adhesive provides a relatively compliant, crack-resistant bondline. Alternatively, adhesive layer 600 may be formed with any number of portions and/or adhesives that enables adhesive layer 600 to function as described herein.

In the exemplary embodiment, first portion 610 and/or second portion 620 are oriented to facilitate coupling patch 110 to structure and/or to facilitate restricting an edge disbond from spreading across body 130. In the exemplary embodiment, first portion 610 may extend across at least a portion of body 130 and/or arms 140, and second portion 620 may extend across at least another portion of body 130 and/or arms 140. Adhesive layer 600 may include any combination of a first pattern 630, a second pattern 640, a third pattern, 650, a fourth pattern 660, a fifth pattern 670, and/or any other pattern of adhesive that enables adhesive layer 600 to function as described herein.

In the first pattern 630, first portion 610 functions as an outer portion that extends generally along edge 170 of patch 110, and second portion 620 functions as an inner portion that is at least partially circumscribed by first portion 610. In the exemplary embodiment, first portion 610 has a substantially uniform width 680 extending along edge 170 of patch 110. Alternatively, first portion 610 may have any width, including varying widths, that enables adhesive layer 600 to function as described herein.

In the second pattern 640, first portion 610 functions as a distal portion that is positioned adjacent to peak 180, and second portion 620 functions as a proximal portion that is positioned adjacent to valley 190. As such, in the exemplary embodiment, first portion 610 is positioned generally radially outward of second portion 620. Moreover, in the exemplary embodiment, an interface 690 defined between first portion 610 and second portion 620 is generally arcuate and extends between opposing lateral sides 700 of arm 140. Alternatively, interface 690 may have any shape and/or configuration that enables adhesive layer 600 to function as described herein.

In the third pattern 650, first portion 610 is positioned adjacent to recess 160, and second portion 620 at least partially circumscribes first portion 610. More specifically, in the exemplary embodiment, first portion 610 surrounds valley 190 and is substantially centered relative to recess 160. Alternatively, first portion 610 may be positioned at any location that enables adhesive layer 600 to function as described herein. In the exemplary embodiment, first portion 610 extends between two adjacent arms 140. More specifically, in the exemplary embodiment, an interface 690 defined between first portion 610 and second portion 620 is generally arcuate and extends between a first lateral side 700*a* of a first arm 140*a* and a second lateral side 700*b* of a second arm 140*b*. Alternatively, interface 690 may have any shape and/or configuration that enables adhesive layer 600 to function as described herein.

In the fourth pattern 660, first portion 610 functions as an outer portion that extends substantially along edge 170 of patch 110, and second portion 620 functions as an inner portion that is at least partially circumscribed by first portion 610. More specifically, in the exemplary embodiment, first portion 610 completely circumscribes second portion 620. Moreover, in the exemplary embodiment, second portion 620 is substantially circular in shape and is substantially centered within arm 140. Alternatively, second portion 620 may be positioned in any location that enables adhesive layer 600 to function as described herein.

In the fifth pattern 670, first portion 610 functions as an outer portion that extends substantially along edge 170 of patch 110, and second portion 620 functions as an inner portion that is at least partially circumscribed by first portion 610. More specifically, in the exemplary embodiment, second portion 620 has a substantially polygonal shape 710 that extends substantially along a radius 720 of arm 140 and is substantially centered radially within arm 140. Alternatively, second portion 620 may have any shape and/or configuration and/or be positioned in any location that enables adhesive layer 600 to function as described herein.

Figure 8:
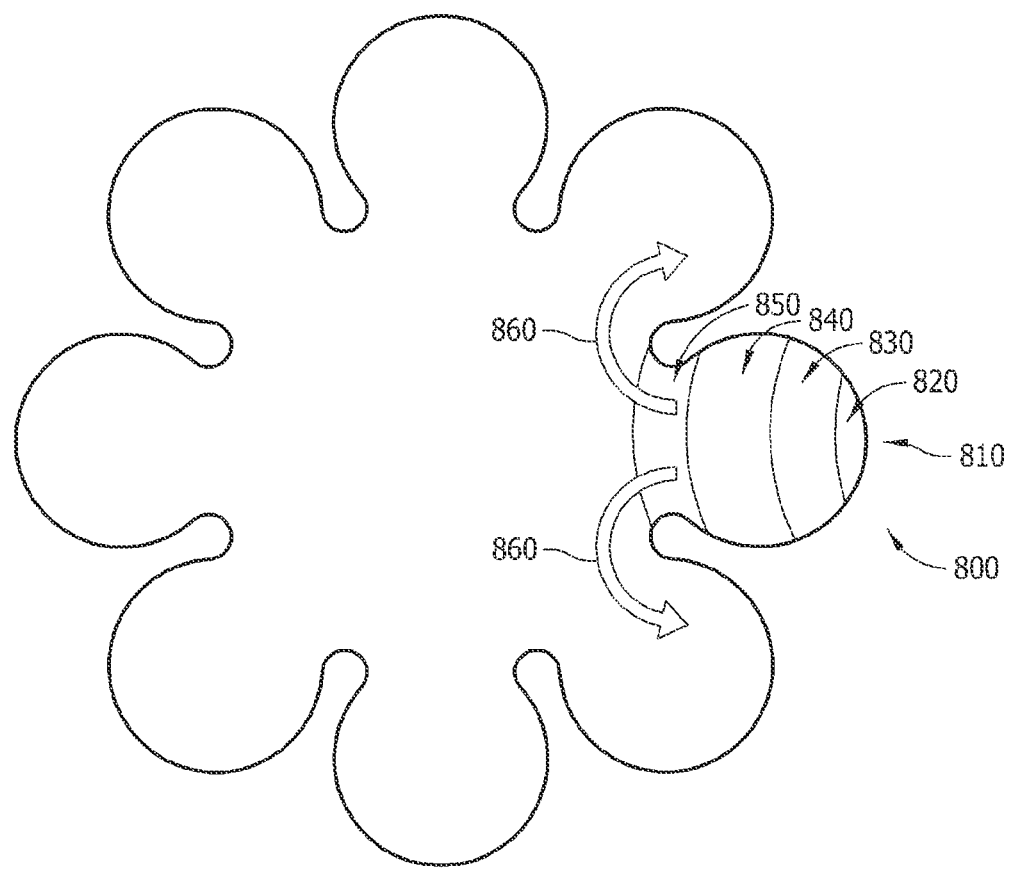
FIG. 8 is a schematic illustration of a disbond growth pattern of the peel-resistant mechanism shown in FIG. 2.

FIG. 8 is a schematic illustration of an exemplary disbond growth pattern 800 of patch 110. In the exemplary embodiment, disbond growth pattern 800 has an initiation point 810 that is positioned adjacent to peak 180. In the exemplary embodiment, pattern 800 spreads generally radially about initiation point 810. More specifically, in the exemplary embodiment, disbond growth pattern 800 spreads radially inward with respect to patch 110 to disbond, in sequential order, a first portion 820, a second portion 830, a third portion 840, and a fourth portion 850 of arm 140.

In the exemplary embodiment, growth pattern 800 is substantially isolated to only one arm 140 of patch 110. In the exemplary embodiment, peel forces generally dissipate due to the converging and then diverging edges 170. More specifically, in the exemplary embodiment, disbond growth pattern 800 is substantially retarded and/or stalls after first, second, third, and fourth portions 820, 830, 840, and 850 are disbonded. That is, in the exemplary embodiment, disbonds that occur at a free edge of the bonded components are forced to grow within a segmented edge detail and generally do not propagate across a gap between segment details. Moreover, in the exemplary embodiment, edge 170 has a scalloped design that causes disbond growth pattern 800 to turn substantially in an opposite direction 860 about valley 190 for disbond growth pattern 800 to continue spreading across patch 110. That is, the disbond propagation progresses to a point where further propagation requires the delamination front to change direction from its original path. This change of direction will require additional energy or a change in the failure mode. This hesitation or stalling of the delamination front provides a failsafe characteristic to the joined or bonded components.

The subject matter described herein relates generally to coupling mechanisms and, more particularly, to a peel-resistant patch that may be used to coupling a plurality of components together and/or repairing structures. The peel-resistant patch includes a plurality of arms that are positionable to facilitate restricting an edge disbond from spreading across a body of the patch. That is, the patch is robustly coupled to the structure and facilitates isolating and/or stopping an edge peel and/or an edge disbond from growing beyond one of the arms. As such, use of the patch described herein facilitates increasing the reliability and/or efficiency of coupling a plurality of components together and/or repairing a structure.

Exemplary embodiments of systems and methods for using a peel-resistant patch are described above in detail. The systems and methods are not limited to the specific embodiments described herein, but rather, components of systems and/or steps of the method may be utilized independently and separately from other components and/or steps described herein. Each component and each method step may also be used in combination with other components and/or method steps. Although specific features of various embodiments may be shown in some drawings and not in others, this is for convenience only. Any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of providing a peel-resistant mechanism, said method comprising:
    positioning a body; and
    forming a plurality of arms on the body, wherein each of the arms includes a first section coupled to the body and a second section extending from the body such that a recess is defined between each pair of adjacent arms, wherein the first section has a smaller width than the second section, and the second section is wider than a greatest width of the recess, wherein at least one of the plurality of arms is positionable to facilitate restricting an edge disbond from spreading across the body.

2. A method in accordance with claim 1, wherein forming a plurality of arms further comprises orienting the arms such that the mechanism has a scalloped edge design.

3. A method in accordance with claim 1 further comprising applying an adhesive layer to at least one of the body and the plurality of arms.

4. A method in accordance with claim 3, wherein applying an adhesive layer further comprises:
    applying a first adhesive having a first adhesive property to a first portion; and
    applying a second adhesive having a second adhesive property to a second portion, the second adhesive property different than the first adhesive property.

5. A method in accordance with claim 4 further comprising extending the first portion generally along an edge of at least one of the plurality of arms.

6. A method in accordance with claim 5 further comprising sizing the first portion to have a substantially uniform width along a length of the edge.

7. A method in accordance with claim 4 further comprising extending the second portion substantially along a radius of at least one of the plurality of arms.

8. A method in accordance with claim 7 further comprising sizing the second portion to have a substantially polygonal shape.

9. A method in accordance with claim 4 further comprising:
    positioning the first portion adjacent to the recess; and
    positioning the second portion generally radially inward of the first portion.

10. A method in accordance with claim 3, wherein applying an adhesive layer comprises applying the adhesive layer on an exterior surface of at least one of the body or the plurality of arms.

11. A method in accordance with claim 1 further comprising extending the second section of each of the arms generally radially from a center of the body.

12. A method in accordance with claim 1, wherein forming a plurality of arms comprises forming the plurality of arms such that the recess defined between each pair of adjacent arms has a substantially circular cross-sectional shape.

* * * * *